March 24, 1964   J. N. HAIMSOHN ETAL   3,126,256
REMOVAL OF PHOSGENE FROM $BCl_3$
Filed Feb. 2, 1960
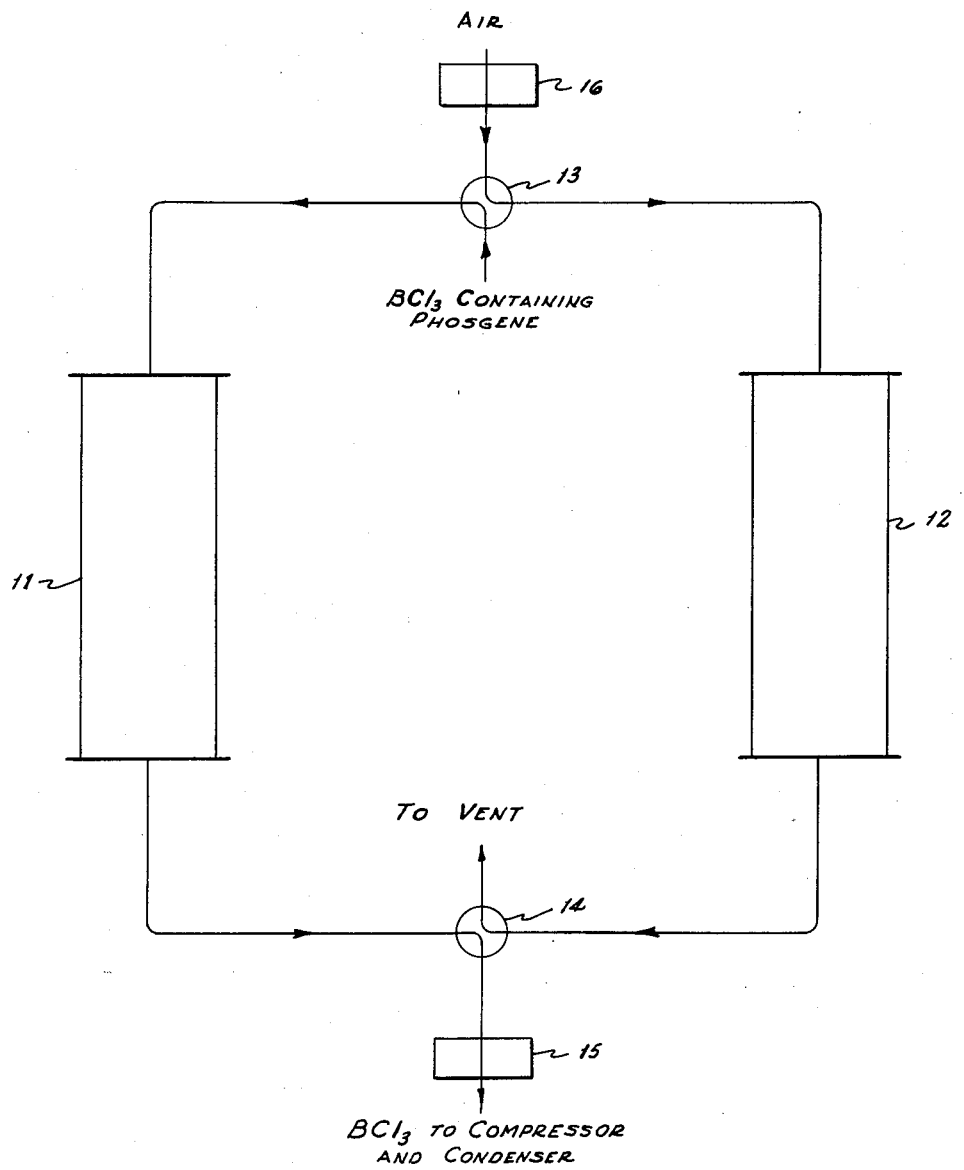
INVENTOR.
JEROME N. HAIMSOHN
LAWRENCE A. SMALHEISER
BY BENJAMIN J. LUBEROFF
*Eckhoff and Slick*
ATTORNEYS United States Patent Office 3,126,256
Patented Mar. 24, 1964

3,126,256
REMOVAL OF PHOSGENE FROM BCl₃
Jerome N. Haimsohn, Ardsley, Lawrence A. Smalheiser, Spring Valley, and Benjamin J. Luberoff, Monsey, N.Y., assignors to Stauffer Chemical Company, a corporation of Delaware
Filed Feb. 2, 1960, Ser. No. 6,291
8 Claims. (Cl. 23—205)

This invention relates in general to the removal of a phosgene impurity from a gas stream containing predominantly boron trichloride, and more particularly to a process for the purification of boron trichloride by the cracking of phosgene contained therein, said cracking being accomplished in the presence of a carbonaceous catalyst and at relatively low temperatures.

In the course of various well-known processes for the manufacture of boron trichloride by the reduction-chlorination of boron-containing substances, a by-product, phosgene, is produced. The phosgene forms an admixture with the boron trichloride product. Several methods are available for eliminating a phosgene impurity from $BCl_3$ such a thermally cracking the phosgene at high temperatures, viz. about 1000° C. It is also known that the passing of phosgene containing a certain amount of water over charcoal will catalyze an hydrolysis reaction. However, this second method of eliminating phosgene is unsuitable for eliminating phosgene from a boron trichloride stream, as the water is preferentially consumed by the $BCl_3$ which is present in excess relative to the phosgene impurity.

It is therefore an object of this invention to provide a method for the removal of phosgene impurity from a stream of boron trichloride by a process requiring relatively mild reaction conditions.

A further object of the invention is to provide for the removal of the phosgene impurity from a stream consisting primarily of boron trichloride by a process utilizing catalytic cracking of the phosgene.

Still another object of the invention is to provide for the elimination of a phosgene impurity in a $BCl_3$ stream by catalytic cracking and also the removal of the products secured by the cracking of the phosgene.

Further objects and advantages of this invention, if not specifically set forth, will become apparent during the course of the description which follows.

It has been found that phosgene may be separated from boron trichloride by passing the stream of boron trichloride containing the phosgene impurity over a carbon catalyst maintained at a temperature of between about 300° and 700° C., at which temperature the phosgene will be cracked to carbon monoxide and free chlorine. The carbon monoxide may be separated from the boron trichloride simply by condensation and stripping of the $BCl_3$ at a temperature whereat the CO remains as a permanent gas; the chlorine may be adsorbed by the carbonaceous catalyst, or may be removed from the boron trichloride stream in any one of several ways. Preferably, in order to provide a one-step process, the carbon catalyst is first activated by heating it to a temperature of at least about 800° C. After such treatment, the carbon is capable of adsorbing substantial quantities of the chlorine released. When the carbon no longer adsorbs the chlorine, it may be reactivated by again being heated to at least about 800° C. Other methods for separation of the chlorine from the boron trichloride stream are: contacting the gaseous stream with a chlorine scavenger such as molten sulfur or vaporous sulfur; fractionally distilling the $BCl_3$ from the $Cl_2$; forming HCl by contacting the stream containing $BCl_3$ and $Cl_2$ with hydrogen and thereafter distilling the HCl from the $BCl_3$; and finally, adsorbing the $Cl_2$ impurity in the $BCl_3$ stream by passing the gaseous stream over a second bed containing activated carbon at a temperature below about 100° C. This second bed of activated carbon is prepared by heating it to about 800° C. in the manner described above.

Forms of carbon which may be used are charcoal, petroleum coke, coal-derived activated carbon and the like; all are commercially available materials. Preferably, the carbon is ground to a particle size of between about $-\frac{1}{2}''$ and $+40$ mesh.

The reaction is expeditiously carried out by placing the cracking catalyst in a column heated by external means or by internally mounted resistance wiring or (but not preferably) by passing in a stream of oxygen to react with carbon and thus supply the necessary heat. The reaction vessel should be preheated to within the range 300–700° C. and the $BCl_3$ stream containing the phosgene impurity run in. The exit gas stream will contain the boron trichloride, carbon monoxide and possibly some chlorine, depending upon the state of activation of the carbon catalyst used within the reaction vessel. Flow rates may range between about 0.05 and 1 foot/second. If other than an activated carbon catalyst is used and the chlorine thus not adsorbed, it may be separated from the predominantly $BCl_3$ stream by any of the methods described earlier.

If it is desired to separate the $Cl_2$ from the $BCl_3$ by adsorbtion on the carbon bed, the catalyst must be periodically regenerated to remove the $Cl_2$ adsorbed. Regeneration is effected by treatment with air, $CO_2$ or steam at 300 to 700° C.

Various examples are set forth below for illustrative purposes but are not to be interpreted as imposing limitations on the scope of the invention other than as set forth in the appended claims.

*Example I*

A 1" diameter tube charged with 100 g. of activated charcoal pellets ($-6 +16$ mesh) was placed in a vertical tube furnace and heated to 600° C. Crude boron trichloride produced by the reduction-chlorination of $B_2O_3$ containing 4.4 weight percent phosgene and 0.5% free chlorine was metered downward through the tube. The product was condensed in a freezing bath and the CO vented. The resulting liquid was yellow green ($Cl_2$).

When the residence time in the hot zone was two seconds the boron trichloride product contained no detectable phosgene by infrared analysis (viz. less than 0.02%).

When the carbon bed was replaced by one composed of silica chips and the experiment repeated the product contained 4.0% phosgene after 20 seconds residence time in the hot zone. The insignificant reduction in phosgene over an inert heat transfer bed illustrates the efficacy of carbon in removing phosgene.

*Example II*

The apparatus and operation was essentially like that in Example I. However, the operating temperature was maintained at 400° C. The bed consisted of 76 g. of carbon (previously activated by heating to 800° C.); the feedstock was boron trichloride containing 2.9% phosgene and 0.5% free chlorine. At a flow rate of 10 g./minute, 395 g. water-white boron trichloride, free of both phosgene and chlorine, was recovered.

Both phosgene and free chlorine were removed at flow rates as high as 60 g./minute; higher flow rates could be used but excessive pressure drops were encountered under laboratory trial.

This example illustrates the simultaneous removal of phosgene and free chlorine in a single operation.

At 300° C. the same feedstock yielded a product containing 1% phosgene and no free chlorine (viz. less than 0.1%). With a silica bed in place of carbon, the composition of the feedstock was unchanged with respect to both phosgene and chlorine.

It was noted that chlorine appeared in the product after a certain amount of material had passed through a given carbon column. If one does not desire to remove both chlorine and phosgene then one can use the carbon longer by operating at higher temperatures as in Example I.

Additional runs were made under conditions generally as set forth in Example I, and the chlorine, part of which was due to the cracking of the phosgene and part of which was present in the $BCl_3$ gas as an impurity following the reduction-chlorination of $B_2O_3$, was removed by several alternative procedures. First, the effluent chlorine-containing product was passed through molten sulfur maintained at a temperature somewhat in excess of 130° C. The free chlorine was adsorbed, and the $BCl_3$ obtained as a relatively pure gas stream. In an additional run, the chlorine was separated from the $BCl_3$ by fractional distillation, the condenser being cooled to a temperature of about +5° C. Since chlorine gas has a B.P. of about −35° C. and since $BCl_3$ condenses at about 13° C., separation of the two is an elementary problem in fractional distillation and wide variations in operating procedures are possible. A further run was made by heating sulfur to about 450° C. to form a vapor which was then mixed with the hot $BCl_3$-containing gas emerging from the carbon-packed reactor column. The sulfur chlorides, along with excess sulfur were readily condensed from the $BCl_3$ gas at 20° C.

In still another run at about 600° C., the effluent gas stream containing $BCl_3$ and chlorine was passed through a second preheated (to 100° C.) tube packed with carbon pellets. The gas exiting from this tube was virtually pure $BCl_3$, the chlorine having been adsorbed by the carbon. The carbon in the second tube was reactivated by being heated to 500° C. when the free chlorine content of the effluent gas stream reached 0.2%.

The figure depicts a semi-works plant for continuously removing phosgene and chlorine from boron trichloride and for reactivating the carbon. Units 11 and 12 are externally heated tubes 10″ in internal diameter. Each is packed to a depth of 3′ with active carbon granules (¼″). Numbers 13 and 14 refer to coupled selector valves whose positioning is determined by the signal from a continuous infrared analyzer 15. Unit 16 is an anticipating, temperature actuated flow regulator.

In operation, column 11 is brought to 400–500° C. and preheated, vaporous boron trichloride containing phosgene is metered through it. Analyzer 15 is adjusted to actuate simultaneously valves 13 and 14 when the phosgene content in the effluent gas reaches a predetermined level. When this level is reached, the boron trichloride stream is switched to column 12 which is at 400–500° C. and air is passed through column 11 in order to regenerate the carbon contained therein. Valve 16 automatically controls the air flow rate in order to maintain the bed being regenerated below 500° C. (Air flow is decreased in order to decrease the temperature.) Temperature is sensed via a thermocouple coupled with the selector valve actuating signal of unit 16.

The above cycle is automatically repeated as frequently as necessary in order to produce continuously a product of given quality. This system provides for continuous cracking of the phosgene in a $BCl_3$ stream and adsorbtion of the CO produced but does not separate the free $Cl_2$. A separate removal operation, as described above, is needed.

*Example III*

In a typical run, boron trichloride containing 2.5% phosgene was fed at the rate of 400 lbs./hour. When the plant was set to produce a product containing 0.10% phosgene, cycling occurred about every 1.8 hours.

In order to yield more economical operation the heated gas produced in the burn-off cycle can be used to jacket the sister unit and/or preheat the feed. Carbon is replenished when the cycle time becomes too short.

Obviously, many modifications and variations of this invention may be made without departing from the scope and spirit thereof and therefore only such limitations should be imposed as are indicated in the appended claims.

We claim:

1. A process for purifying a stream consisting primarily of boron trichloride and containing phosgene as an impurity comprising: passing a stream containing boron trichloride and phosgene as an impurity over a catalyst consisting of carbon maintained at a temperature of between about 300° C. and 700° C. whereby said phosgene is cracked to carbon monoxide and free chlorine and removing the carbon monoxide and chlorine so produced from the boron trichloride stream whereby to produce substantially pure boron trichloride.

2. The process of claim 1 wherein said chlorine is separated from said boron trichloride by fractional distillation.

3. The process of claim 1 wherein said chlorine is separated from said boron trichloride by passing the exit stream through molten sulfur.

4. The process of claim 1 wherein the chlorine is separated from said boron trichloride stream by contacting said stream with vaporous sulfur.

5. The process of claim 1 wherein the exit gas stream containing said boron trichloride and said chlorine is admixed with a stream of hydrogen whereby said chlorine forms HCl which is thereafter separated from said boron trichloride by distillation.

6. The process of claim 1 wherein the exit gas stream containing boron trichloride and free chlorine is passed over a second bed of activated carbon at a temperature of between about 50 and 150° C. whereby said chlorine is adsorbed by said bed.

7. The process of claim 1 wherein the carbon catalyst is first activated by heating said catalyst to a temperature of at least about 800° C. and said chlorine and carbon monoxide are adsorbed thereon.

8. The process of claim 1 wherein the carbon catalyst is periodically regenerated by passing thereover air at a temperature of about 500° C., said carbon catalyst being so regenerated whenever the phosgene content of the effluent gas stream reaches a predetermined level.

References Cited in the file of this patent

UNITED STATES PATENTS

| | | |
|---|---|---|
| 1,519,470 | Wilson et al. | Dec. 16, 1924 |
| 2,097,482 | Weber | Nov. 2, 1937 |
| 2,369,214 | Cooper | Feb. 13, 1945 |
| 2,415,958 | Meyers | Feb. 18, 1947 |
| 2,931,710 | Leffler | Apr. 5, 1960 |
| 3,037,337 | Gardner | June 5, 1962 |

FOREIGN PATENTS

| | | |
|---|---|---|
| 229,334 | Great Britain | Nov. 12, 1925 |

OTHER REFERENCES

Mellor: "Comprehensive Treatise on Inorg. and Theoretical Chemistry," vol. 5, 1924, Longmans, Green & Co., N.Y., pages 130 and 963.

Bunbury: "Journal of the Chemical Society (Transactions)," vol. 121, pages 1525–1528 (1922).